United States Patent [19]

Zwicky et al.

[11] Patent Number: 5,134,041
[45] Date of Patent: Jul. 28, 1992

[54] MAGNETIC STORAGE MEDIUM CONTAINING AT LEAST TWO DIFFERENT POPULATIONS OF MAGNETIC PARTICLES EACH POPULATION HAVING A SEPARATE MEAN COERCIVE FIELD STRENGTH

[75] Inventors: Paul Zwicky, Dielsdorf; Matthias Zbinden, Regensdorf, both of Switzerland

[73] Assignee: Willi Studer AG, Regensdorf, Switzerland

[21] Appl. No.: 577,518

[22] Filed: Sep. 5, 1990

[30] Foreign Application Priority Data

Sep. 5, 1989 [CH] Switzerland ............... 3224/89

[51] Int. Cl.$^5$ ............................................. G11B 5/00
[52] U.S. Cl. ................................. 428/692; 428/694; 427/128; 252/62.56
[58] Field of Search ............... 428/900, 694, 692, 693; 360/131; 427/128; 252/62.56

[56] References Cited

U.S. PATENT DOCUMENTS

| | | | |
|---|---|---|---|
| 3,653,962 | 4/1972 | Akashi et al. | 117/240 |
| 4,259,392 | 3/1981 | Suzuki | 428/212 |
| 4,281,043 | 7/1981 | Deffeyes | 428/457 |
| 4,500,599 | 2/1985 | Ogawa et al. | 428/336 |

Primary Examiner—Paul J. Thibodeau
Assistant Examiner—Stevan A. Resan
Attorney, Agent, or Firm—Egli International

[57] ABSTRACT

In order to be able to improve the level or the dynamic ratio and the signal-to-noise ratio of a magnetic storage medium for analog signal recording, with the distortion factor remaining the same, certain rules are formulated for the quality of the magnetic particles in the storage medium. According to these rules the particles shall be of at least two kinds, all particles of one kind having the same structure. Furthermore, the distribution curve (9) which specifies how many particles possess a certain coercive field strength shall be broadened in the range (20) of the most frequent coercive field strength ($H_c9$), as compared to a Gaussian distribution.

8 Claims, 4 Drawing Sheets

MAGNETIC STORAGE MEDIUM CONTAINING AT LEAST TWO DIFFERENT POPULATIONS OF MAGNETIC PARTICLES EACH POPULATION HAVING A SEPARATE MEAN COERCIVE FIELD STRENGTH

The invention relates to a magnetic storage medium for the storing of analog signals possessing magnetized particles whose coercive field strength is distributed around a mean value.

Known storage media or recording media such as for example magnetic tapes, magnetic cards or magnetic disks consist of a substrate such as for instance synthetic materials and a magnetizable layer applied on top of it. This layer consists for example of a binder into which a great number of magnetizable magnetic particles is integrated. These particles can be used for the storage of a signal by letting their magnetization be flipped by a magnetic field in domains of predominantly the same polarity. The magnetization of such magnetic particles is subject to a physical law that is known per se and is expressed by the known magnetic status curve which shows the increase of the magnetic flux density of the magnetized particles as a consequence of the applied field strength. According to this, the magnetic flux density of the magnetic particles follows at first a so-called new or fresh curve and reaches saturation. In the course of subsequent reversals the flux density as a function of the applied field strength runs through other curves and calculation is now to be done with the known hysteresis loop.

In order to store a signal on the recording medium with as few distortions as possible, a relation as linear as possible between the applied field strength and the resulting flux density of the magnetic particles on the recording medium or between the energizing signal field and the stored magnetization is desirable. This has so far been accomplished by laying the AC signal to be recorded over a DC pre-magnetization. This led indeed to the desired linear relation as long as the energizing signal field was oscillating between lower and upper extreme values which demarcated a range whose value was not much greater than the value of the DC pre-magnetization. However, the DC pre-magnetization caused a strong noise.

At a further point in time an AC pre-magnetization was laid over the energizing signal field. This pre-magnetization has a higher frequency and amplitude than the signal to be recorded. It causes the individual magnetic particles to be magnetized positively or negatively up to the point of saturation. Yet, also in this case the range in which the relation between the energizing magnetic field and the stored magnetization is linear remains limited. In addition, further demands are placed on such recordings. The level of the recorded signal should for example be as high as possible and the influence of the magnetic particles on each other when recording media are piled up should still be minor.

In order to avoid such undesired effects and to enhance desirable effects, it was proposed in EP-A-0105079 that the concentration of the magnetic particles on the recording medium be increased. Another measure is known from DE-B-2556188. According to it the frequency characteristics were improved in recording media having magnetizable particles applied in several layers with different properties of the magnetic particles in each layer.

Even though the improvements that have so far been proposed are advantageous, further improvements are desirable. Hence the now initiated trend toward digital recording technology. It renders the desired improvements possible, however, it is very costly and delicate. Furthermore, the standards for digital recording have not been sufficiently established. For this reason, consumers with large archives do not want to introduce the digital recording technology until it is certain that the standard will not change anymore and the stability of the tapes necessary for the filing is guaranteed. Therefore it is desirable that analog recording be improved.

The invention, as characterized in the claims, attains the object of creating a magnetic storage medium with magnetic particles, which for analog recording permits the improvement and in particular the broadening of the linear relation between the energizing signal field to be recorded and the magnetization stored in the storage medium.

This is achieved, according to the invention, in that such magnetized particles in the storage medium are provided in such way that together they lead to a statistical distribution of the coercive field strength of the various particles which is expanded or broadened in the range of a value for a maximum particle occurrence, as compared to a Gaussian distribution of the coercive field strength. For example the curvature of the distribution in the range of a value for a maximum particle occurrence should be as small as possible as compared to the natural (Gaussian) distribution.

The advantages obtained by the invention reside essentially in the fact that as yet customary values for the magnetization of the storage medium could be surpassed by far. While so far it had been possible to utilize only about 30% of the maximum possible magnetization of the storage medium, if not more than 3% were allowed for the distortion factor, now 90% are possible in accordance with the invention. This leads to level in the storage medium which is higher by 6 to 9 dB. In this way also the signal-to-noise ratio is increased considerably and the dynamic ratio improved. In combination with other improvements possible nowadays, the analog recording of signals becomes practically as good as their digital recording with a resolution of 16 bit. Yet the typical advantages of analog recording remain intact.

On the following pages the invention is explained in further detail with the help of drawings in which merely one embodiment is shown.

The invention, and thus the subsequent embodiments, proceeds from a magnetization model as described in IEEE Transactions on Magnetics, Vol. Mag-15, No. 1, January 1979, entitled "Nonlinear Distortion in Long Wavelength AC Bias Recording" (Tatsuo Fujiwara). This model proceeds from the fact that similar magnetized particles which have a mean coercive field strength $H_c$ are distributed corresponding to a Gaussian distribution function.

Figure 1:
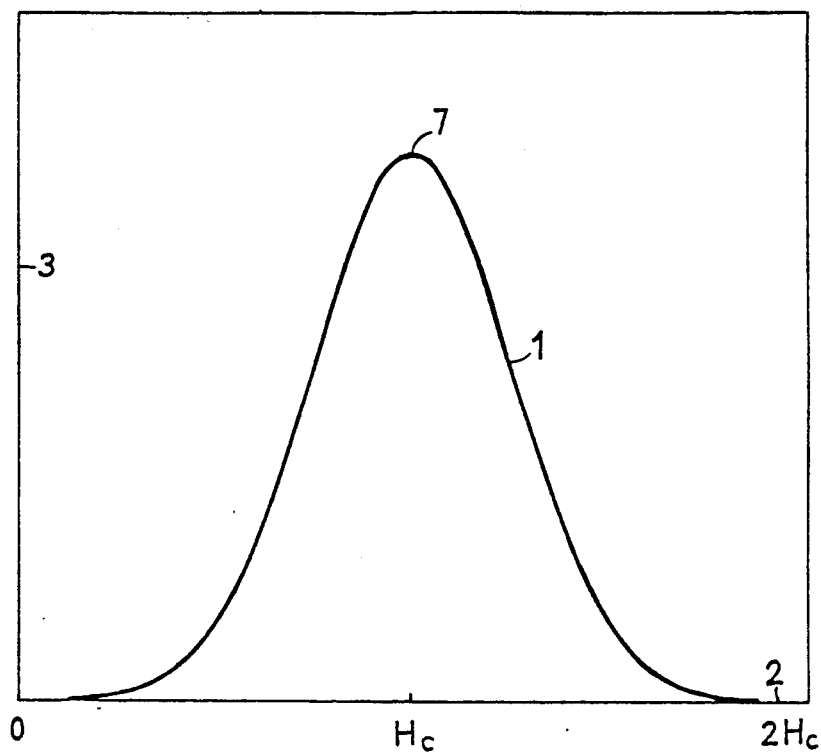
FIG. 1 shows a Gaussian distribution of magnetized particles.

FIG. 1 shows such a Gaussian distribution curve 1 drawn above a horizontal axis. On this axis 2 values are plotted for the coercive field strength H, $H_c$ being the mean coercive field strength of the magnetic particles of the distribution according to distribution curve 1. On a vertical axis 3 the number of magnetic particles is plotted.

Figure 2:
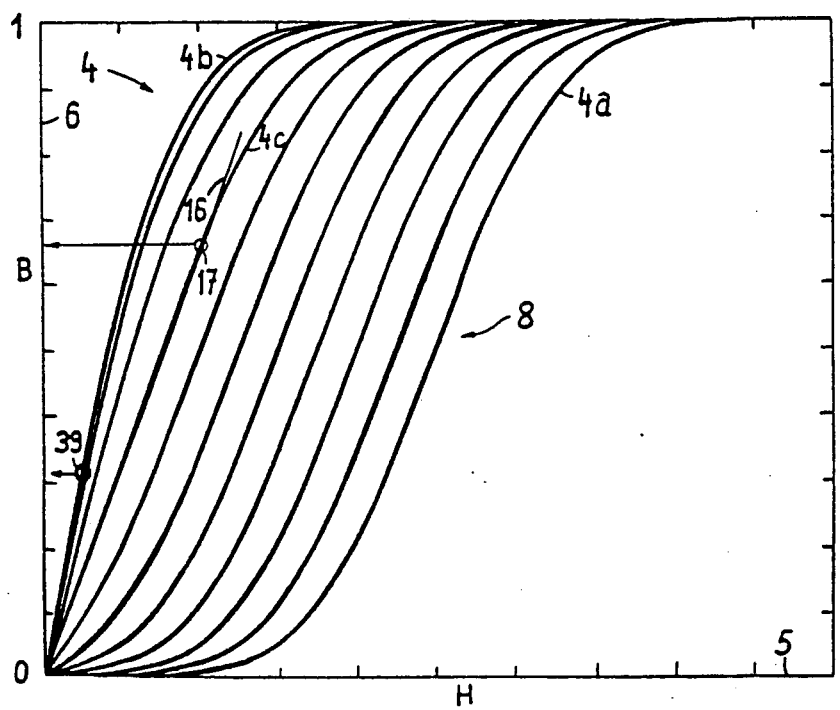
FIG. 2 shows a bundle of characteristic magnetization curves.

FIG. 2 shows the characteristic magnetization curves 4, the calculation of which is known from the aforementioned publication, and which apply to the mentioned magnetization model. On a horizontal axis 5 values are plotted for the field strength H of a DC field of one polarity. This DC field corresponds to the field created by the signal to be recorded, i.e. for example by a current in a recording head. In reality, this field is not a DC field. It must be understood as a momentary value of an alternating field to be recorded, and is in this case specified as a DC field for reasons of simplification. On a vertical axis 6 the relative magnetization of the magnetic particles of the storage medium of the magnetic flux density B of one polarity are plotted, in the instance with values ranging from zero to one. The value one signifies saturation. To each of the characteristic curves 4 a value for the field strength of the pre-magnetization field is assigned. To a characteristic curve 4a a relative pre-magnetization field strength 0 is assigned, to a characteristic curve 4b a relative pre-magnetization field strength 1. The remaining characteristic curves 4 are assigned to steps by 0.1 of the pre-magnetization field strength. Pre-magnetization field strength 0 signifies that there is no pre-magnetization. Pre-magnetization field strength 1 signifies that the field strength of the pre-magnetization is as large as the mean value of the coercive field strength which is necessary to flip the magnetization of the set of particles. For a set of magnetic particles as represented by the distribution curve 1 in FIG. 1 this value amounts to just $H_c$.

When looking for the curve of the characteristic curves 4 that possesses the longest straight part, the result is the operating case in which the relation between the energizing signal field or magnetic field and the recorded magnetization has the broadest linear part. In this example this is about the case for a characteristic curve 4c. Ascribed to it is a tangent 16 passing the zero point. It can be observed that the characteristic curve 4c follows this tangent 16 up to a point 17. This means that with a Gaussian distribution of the coercive field strength of the magnetic particles according to FIG. 1 the best linearity of the mentioned relation appears for a pre-magnetization field strength corresponding to a value 0.7 times the field strength which creates the signal to be recorded. In this way about 66% of the maximum possible magnetization are utilized as can be read off on the axis 6. For such a storage medium the pre-magnetization relative to the signal field should therefore be adjusted to this value. However, this view is valid only for a thin domain or a thin layer within the magnetizable layer on the storage medium in which exist magnetizable particles. Adjacent domains or other thin layers within the magnetizable layer are magnetized in a stronger way if they are nearer to the source of the field (e.g. the magnetic head) and vice versa. Since stronger fields lead asymptotically to the curve 4b this curve becomes more important if the effect of the domains is integrated over the entire thickness of the magnetizable layer. In practice, it is therefore probably more desirable to choose the operating case on the characteristic curve 4b. This curve, however, is only straight enough up to a point 39. This means that in this way about 30% of the maximum possible magnetizability can be exploited if only minor distortions are tolerated. This corresponds to the state of the art.

There is a relation between FIGS. 1 and 2. The maximum value 7 with the coercive field strength $H_c$ in FIG. 1 determines the maximum steepness of the characteristic curves 4 in FIG. 2 in a range 8. Considering that a set of magnetized particles present, which together result in a mean field strength 0, is composed of a subset of positively magnetized particles and a subset of negatively magnetized particles with mean coercive field strengths $+H_c$ and $-H_c$, both of which are distributed according to a Gaussian distribution function around the values $+H_c$ and $-H_c$, then the following is true:

The greater the field strength of the field or signal to be recorded, the greater the number of magnetic particles of the one subset whose magnetization is flipped and the greater the number of the other subset whose magnetization is not flipped (also see FIG. 1 of the aforementioned publication). The integral of the field strength of the flipped magnetic particles produces the characteristic curves 4. The course of the characteristic curve 4a which is assigned to a magnetization without pre-magnetization corresponds to the integral of the distribution curve 1 of FIG. 1.

Figure 3:
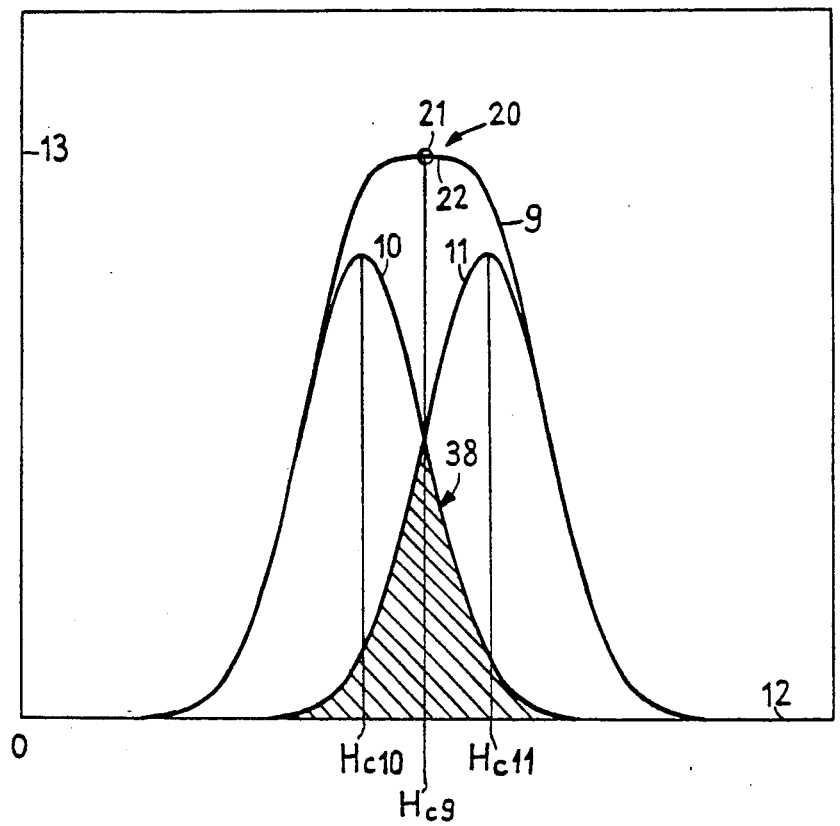
FIG. 3 shows several distribution curves.

FIG. 3 shows further distribution curves 9, 10 and 11 of particle coercive field strengths similar to the distribution curve 1 in FIG. 1. In this case, axes 12 and 13 correspond to axes 2 and 3 from FIG. 1. The distribution curves 10 and 11 are Gaussian distribution curves for two subsets or kinds of different magnetic particles. For each subset a mean coercive field strength $H_{c10}$ and $H_{c11}$ is shown in the drawing. For the entire set of magnetic particles to which the distribution curve 9 is assigned a mean coercive field strength $H_{c9}$ is shown in the drawing. Both distribution curves 10 and 11 overlap in a range 38. It can also be seen that the distribution curve 9 is broadened in one range 20 with regard to the Gaussian distribution curve 7 by a maximum value 21, or has a horizontal section 22 of minor curvature.

Figure 4:
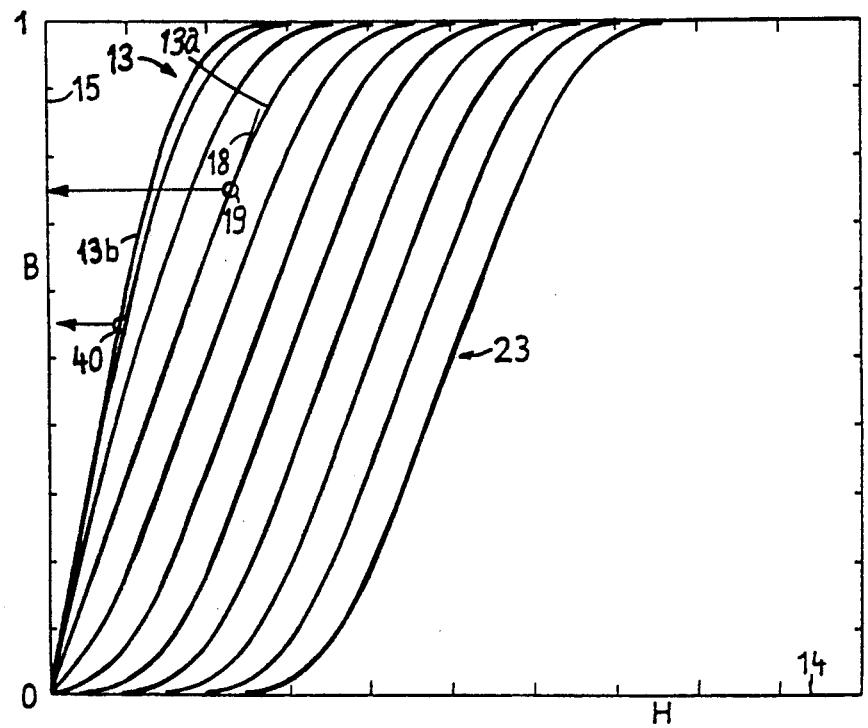
FIG. 4 shows another bundle of characteristic magnetization curves.

FIG. 4 shows characteristic magnetization curves 13 that are derived according to the same principles as for FIG. 2 and plotted on the axes 14 and 15 which correspond to the axes 5 and 6 of FIG. 2. In this case, too, there are provided eleven characteristic curves 13 for pre-magnetization field strength values from zero to one. These characteristic curves 13 refer to the total amount of magnetic particles in the storage medium and thus to the distribution curve 9 in FIG. 3. It can be readily observed that the characteristic curves 13 possess longer straight ranges 23 than the straight ranges 8 of the characteristic curves 4 in FIG. 2.

When one looks for the optimal operating case in this instance, one finds it in the range of a characteristic curve 13a to which a tangent is ascribed, too. The characteristic curve 13a neatly follows the tangent 18 up to a point 19. On the axis 15 can be read off that in this way about 75% of the maximum possible magnetization can be utilized with linearity being preserved. The storage medium can thus be driven from the zero point to the point 19 for the magnetization with the one polarity and up to a point of the other polarity in a range in this case not represented in further detail but point-symmetric to it. This holds true for the representation in FIG. 2 and also for the subsequently described FIGS. 6 and 8. However, when one looks for the operating case on a characteristic curve 13b, the magnetization can be effected up to a point 40, which corresponds to approx. 55% of the maximum possible magnetization, and that without further disadvantages.

Figure 5:
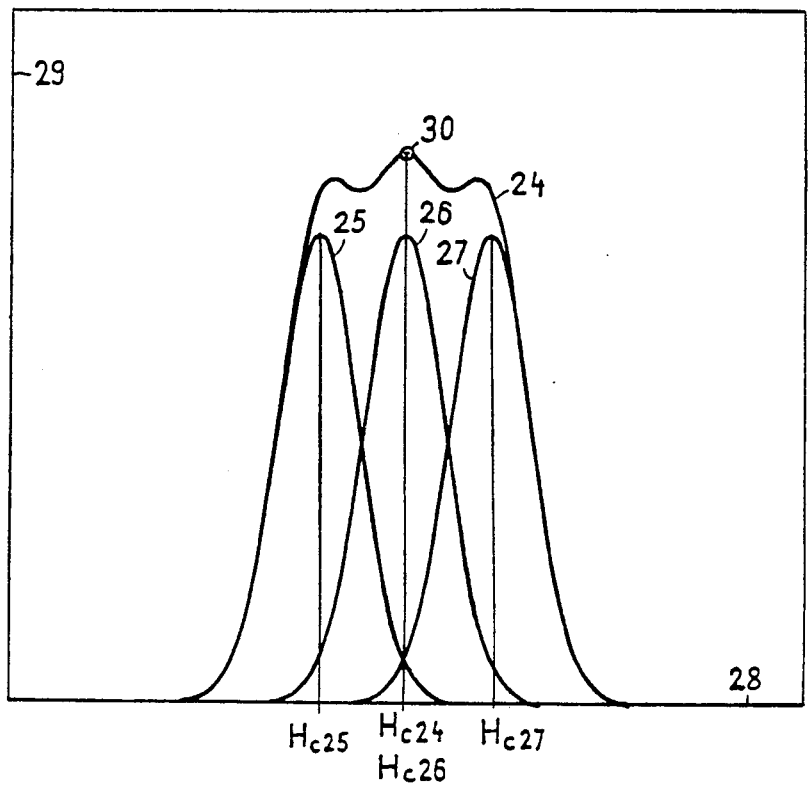
FIG. 5 shows another bundle of distribution curves.

FIG. 5 shows further distribution curves 24, 25, 26 and 27, drawn above the axes 28 and 29, which correspond to the axes 2 and 3 in FIG. 1. To each distribution curve also a mean coercive field strength $H_{c24}$, $H_{c25}$, $H_{c26}$ and $H_{c27}$ is assigned in a now known manner. Also in this case the distribution curve 24 which indicates the distribution of all magnetic particles is broadened, as compared to a pure Gaussian distribution curve, in the range of a maximum value 30 of the number of magnetic particles.

Figure 6:
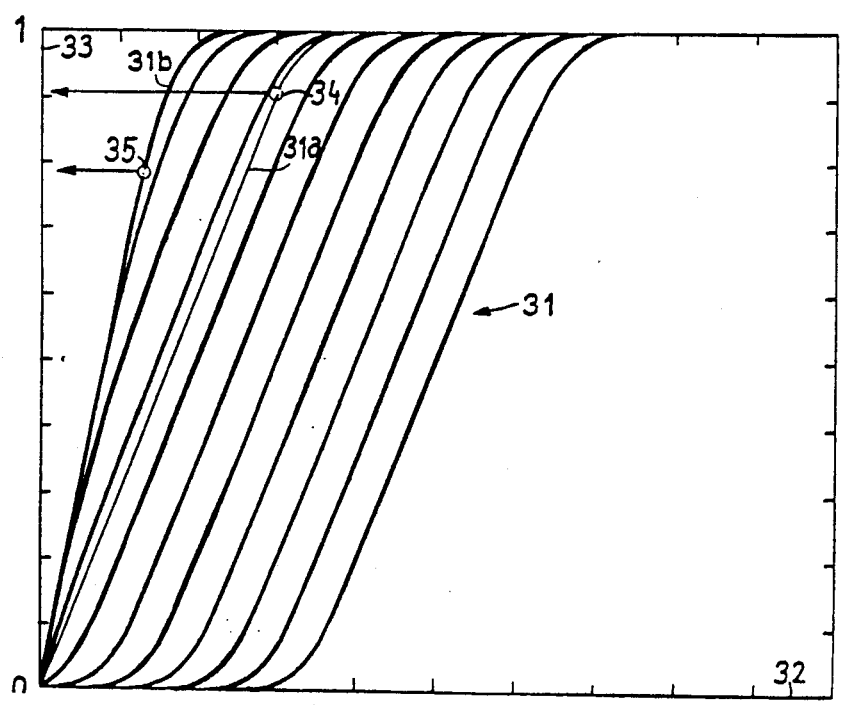
FIG. 6 shows characteristic magnetization curves for the distributions of magnetized particles according to FIG. 5, and FIGS. 7 and 8 show another distribution curve and related characteristic magnetization curves.

FIG. 6 shows magnetization characteristic curves 31 for a set of magnetic particles consisting of three kinds with different properties and for which FIG. 5 shows distribution curves, which are drawn above the axes 32 and 33 as already known from FIG. 2 in the form of axes 5 and 6. In this case, too, there are provided eleven characteristic curves 31 for values from zero to one of the field strength of the pre-magnetization field. These characteristic curves 31 refer to the entire set of magnetic particles of the storage medium and thus to the distribution curve 24 of FIG. 5.

When one looks for the optimal operating case in this instance, one finds it on the additionally drawn characteristic line 31a which is linear up to a point 34. In this way more than 90% of the maximum possible magnetization can be utilized. Another good operating case can be found on a characteristic curve 31b which up to a point 35 can be utilized to up to 80% of the maximum possible magnetization. By selecting the operating case on the characteristic curve 31b one gets around other known problems.

Nevertheless, in comparison to the state of the art as described in FIG. 2 the improvement is remarkable.

Figure 7:
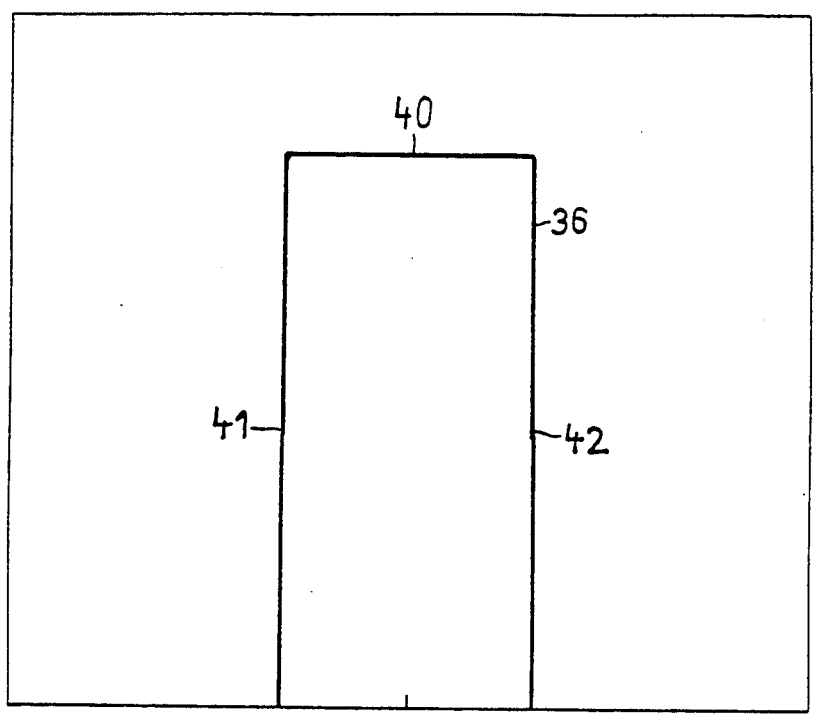

FIG. 7 shows a distribution curve 36 of a now known kind which is obtained when a sufficiently high number of different kinds of magnetic particles are used for the storage medium. It represents an ideal case that can hardly be reached in practice. It is important that the curve be as horizontal and straight as possible in an upper range 40 in order to achieve good linearity of the recording. The steep sides 41 and 42 guarantee that there are no magnetic particles of very small coercive strength which would produce bad copying attenuation and that there are no magnetic particles of very high coercive strength which would be difficult to flip.

Figure 8:
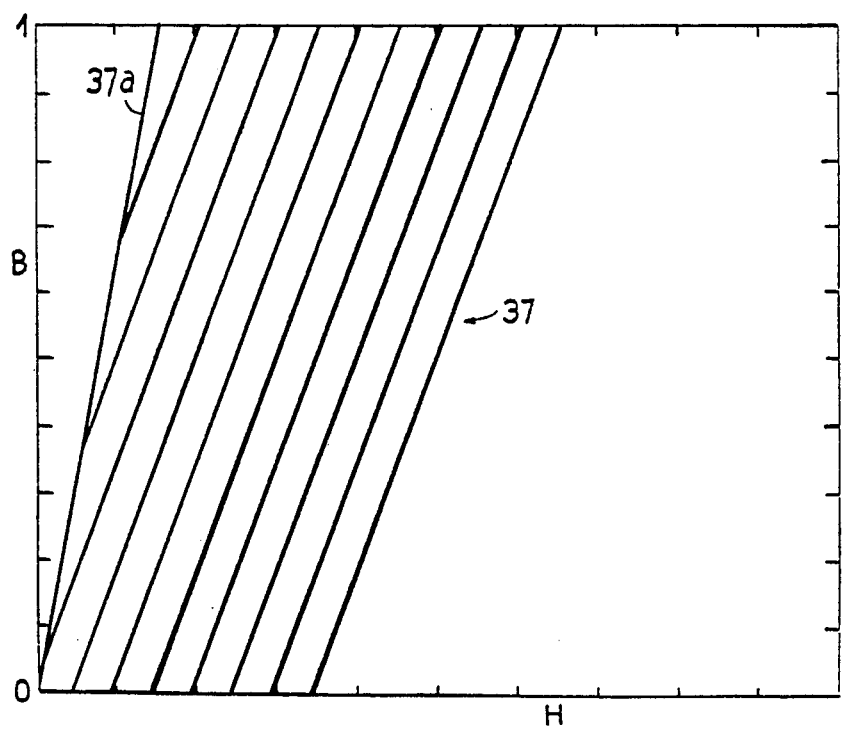

FIG. 8 shows the eleven characteristic curves 37 pertaining to the distribution curve 36 according to FIG. 7. It can be seen from it that only one characteristic curve 37a allows an optimal operating case.

The structure of a storage medium or a recording medium is in principle known from many examples because such storage media are available in commercial practice in great number and variety. It is customary to use similar magnetic particles in these media. These magnetic particles can be similar as to their chemical composition, in which case distinction is made between ferrites, chromium dioxides, highest-grade metals, etc. The magnetic particles may be similar as to their physical structure, in which case this structure is for example crystalline, needle-shaped, cubical, etc. It is also possible to produce similar particle size or orientation. In addition, the magnetic particles can be given the same geometrical shape and dimensions.

In order to benefit from the advantages according to the invention the storage medium should be designed in such way that it contains magnetic particles having such magnetic properties which produce a distribution of the coercive field strength different from a Gaussian distribution in the range of a maximum value, as is shown by comparing the distribution curves 9, 24, 36 with the distribution curve 1. The broader these distribution curves are in their upper range, the better the magnetizability of the storage medium can be exploited without producing distortion. In order to accomplish this there should be at least two different, preferably more, kinds of magnetic particles in the storage medium. These kinds have to be selected in such way that a different distributing of coercive field strengths of the various magnetic particles results for each kind of magnetic particles, whose mean value lies so far off the mean value of the other kind that the distribution curve of both kinds together possesses an upper range 20 that is as broad as possible and that can also have an uneven course of the distribution curve as long as the variations remain small in relation to the maximum amplitude of the distribution curve, as shown for example in FIG. 5 in the proximity of the point 30. This determines the measure for the deviation of the mean coercive field strengths of the various kinds in relation to one another.

It is advantageous that the distribution curves in themselves are symmetrical. Further influences, which may appear during the magnetization flip, can cause that the distribution curves are not symmetrical. Then, one side of the distribution curve will for example be steeper than the other side. This is not considered in the conception of the model mentioned at the outset. As a remedy, one could try to produce magnetic particle kinds in such way that the distribution curve is unsymmetrical from the beginning, namely in such way that the aforementioned influences will then cause the distribution curve to become symmetrical during the magnetization flip. However, if distribution curves (see FIG. 7) are desired that are as rectangular as possible, the mentioned influence should barely become manifest.

It is a further principle of this invention that all magnetic particles within one kind be as similar as possible. Hence, they should have the same chemical/physical structure or they should have the same geometrical shape, etc. Even if this is the objective when producing such magnetic particles, they will not be 100% identical under all aspects. For example they will be identical as to their chemical/physical structure but their dimensions will be subject to deviations. This can then be tolerated and will lead to the exemplary Gaussian distribution of the coercive field strength of the various particles.

It is also plausible to provide such storage media with several layer of magnetic particles. Then, the proposed structure with magnetic particles of two or more kinds shall be done separately for each layer. For at least one layer the magnetic particles, i.e. their coercive field strength, shall produce the proposed distribution.

We claim:

1. A magnetic storage medium for the storing of analog signals possessing magnetic particles having a coercive field strength distributed around a means value ($H_c$), characterized in that said magnetic storage medium having at least two different populations of magnetic particles, each population consisting of magnetic particles which are essentially homogeneous in shape or in a physical or chemical property;

each population of magnetic particles has a respective coercive field strength distributed around a respective mean value ($H_{c10}$, $H_{c11}$,) which results from the chemical and physical properties of the magnetic particles;

each mean value ($H_{c9}$) of the coercive field strength of a respective population of magnetic particles is different from the mean value of the coercive field strength of the other respective populations of magnetic particles; and said magnetic storage medium has a distribution curve that is essentially flat in the range of a composite means value ($H_{c9}$) of a composite coercive field strength calculated for said at least two different populations of magnetic particles.

2. A magnetic storage medium according to claim 1, characterized in that each of said at least two different populations of magnetic particles has a respective Gaussian distribution with a partly overlapping range, and said at least two different populations of magnetic particles has a resulting Gaussian distribution.

3. A magnetic storage medium according to claim 1, characterized in that said at least two different populations of magnetic particles include a population of all magnetic particles having the same chemical and physical structure, which is different from the structure of the other populations of magnetic particles.

4. A magnetic storage medium according to claim 1, characterized in that said at least two different populations of magnetic particles includes a population of all magnetic particles having the same shape, which is different from shapes of the other populations of magnetic particles.

5. A magnetic storage medium for the storing of analog signals possessing magnetic particles having a coercive field strength distributed around a means value ($H_c$), characterized in that said magnetic storage medium having at least two different populations of magnetic particles, each population consisting of magnetic particles which are essentially homogeneous in shape or in a physical or chemical property;

each population of magnetic particles has a respective coercive field strength distributed around a respective means value ($H_{c10}$, $H_{c11}$) which results from the chemical and physical properties of the magnetic particles;

each means value ($H_c$) of the coercive field strength of a respective population of magnetic particles is different from the mean value of the coercive field strength of the other respective population of magnetic particles; and said magnetic particles are arranged in several layers, and for at least onbe layer of the several layers the statistical distribution of coercive field strengths, as compared to a Gaussian distribution, is broadened in the range of the most frequent coercive field strength value.

6. A magnetic storage medium according to claim 5, characterized in that each of said at least two different populations of magnetic particles has a respective Gaussian distribution with a partly overlapping range, and said at least two different populations of magnetic particles has a resulting Gaussian distribution.

7. A magnetic storage medium according to claim 5, characterized in that said at least two different populations of magnetic particles include a population of all magnetic particles having the same chemical and physical structure, which is different from structures of the other populations of magnetic particles.

8. A magnetic storage medium according to claim 5, characterized in that said at least two different populations of magnetic particles include a population of all magnetic particles having the same shape, which is different from shapes of other populations of magnetic particles.

* * * * *